May 28, 1957   M. R. JEPPSON   2,793,970
METHOD OF MANUFACTURING ELECTRICAL CAPACITORS
Filed June 3, 1955
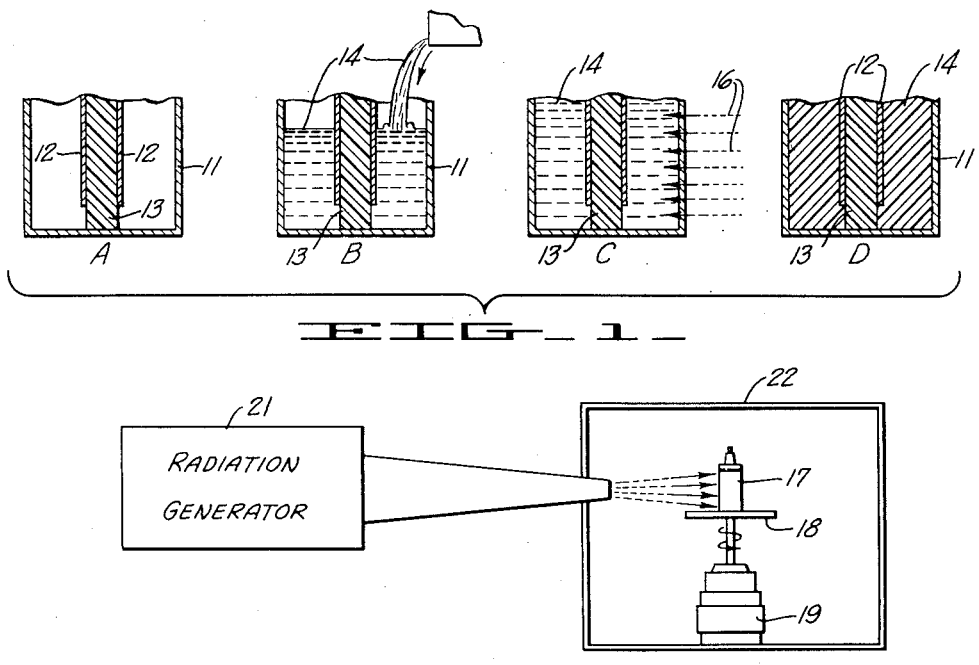
FIG_1_
FIG_2_
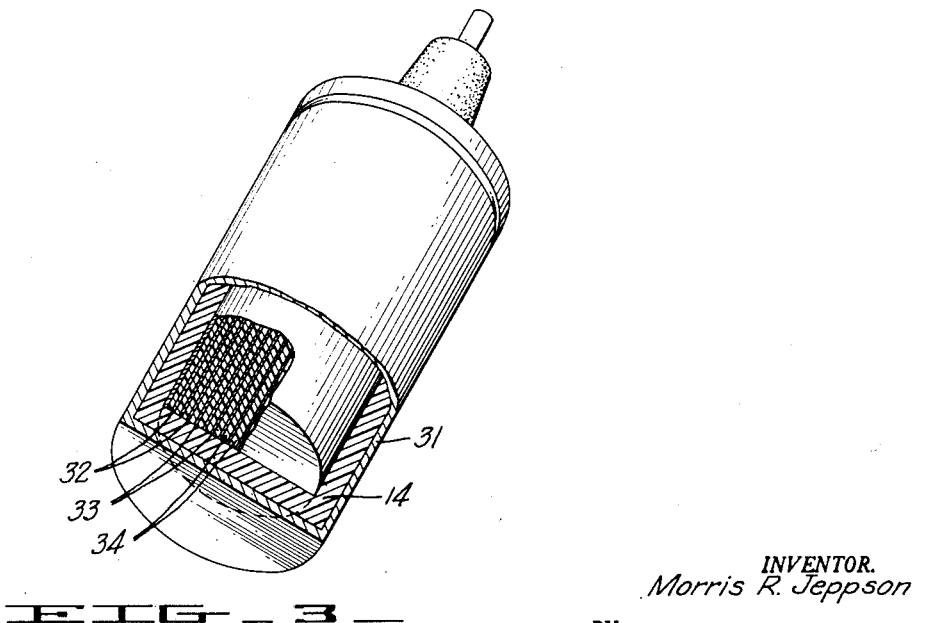
FIG_3_
INVENTOR.
Morris R. Jeppson
BY
William D. Hager
ATTORNEY United States Patent Office 2,793,970
Patented May 28, 1957

2,793,970
METHOD OF MANUFACTURING ELECTRICAL CAPACITORS

Morris R. Jeppson, Orinda, Calif.

Application June 3, 1955, Serial No. 513,076

7 Claims. (Cl. 154—80)

The present invention relates to an improved method of fabricating electrical capacitors and to an improved electrical capacitor. More specifically, the present invention relates to a process of capacitor production wherein a liquid dielectric is employed in the capacitor fabrication and is changed to a solid in the final capacitor state whereby capacitor construction is greatly facilitated. Additionally the present invention relates to an improved capacitor formed in accordance with the aforementioned process and having highly improved capacitor characteristics.

In the construction of capacitors it has been found most convenient to employ solid dielectrics in block or sheet form to separate sheet electrodes whereby the dielectric operates as a structural member of the unit as well as performing its electrical function of insulation. Such structure, however, results in air paths between the electrodes about the solid dielectric and surface discharge paths across the surface of the solid dielectric, both of which limit the required characteristics of the capacitor by providing voltage breakdown paths. The limitations of such capacitors may be materially improved by the use of liquid dielectrics, although structural difficulties then arise. Liquid dielectrics are advantageous in that the capacitor electrodes may be wholly enveloped thereby to remove air and surface discharge paths for voltage breakdown, however, many limitations attend the use of liquid dielectrics. For example, capacitors employing liquid dielectrics in sealed containers have only limited application in circumstances where large temperature variations are encountered, such as in aircraft. Alternatively, if the capacitor is allowed to breathe even through an intermediate chamber, moisture and impurities eventually contaminate the liquid to such an extent as to materially reduce the local dielectric properties thereof.

A further limitation upon the use of liquid dielectrics is found in those applications wherein direct current valtages are employed for there results in such cases a polarization of impurities invariably present in the liquid and a subsequent alignment of same to provide a relatively low voltage discharge path through the liquid whereby the liquid dielectric becomes ineffective as such.

Additionally, it has been found that liquid dielectrics are not as desirable as solid dielectrics for a variety of reasons and yet the enveloping action of liquid dielectrics is highly recommended and in fact necessary for many applications. A solution to this difficulty may be provided by the construction of a capacitor with a liquid dielectric followed by a solidification of same in situ. Drawbacks to this method are found in the fact that many liquid dielectrics cannot be readily solidified or cannot be maintained in solid form at operating temperatures. Of those dielectrics which may be solidified the process of solidification normally requires operations which are deleterious or even destructive of the remaining capacitor structure if same were subjected to such conditions.

The present invention contemplates the production of a capacitor wherein a liquid dielectric is employed in fabrication and is subsequently solidified in position to provide a solid dielectric capacitor with the electrodes thereof wholly enveloped with said dielectric. The process of the invention is accomplished by polymerization of a liquid monomer whereby same solidifies and this polymerization is carried out without the use of high temperatures and/or pressures which would, as previously noted, operate upon the remainder of the capacitor structure in a disadvantageous manner. Polymerization is herein accomplished by irradiation of the chosen monomer with suitable beams or rays, as hereinafter described, whereby molecular cross-linkage results to produce a solid. Polymerization in this manner is not only advantageous in avoiding certain conditions which would be disruptive of other capacitor structure subjected thereto, but also the resultant solid dielectric has greatly improved properties over similar materials more conventionally prepared, particularly as regards use thereof as a dielectric.

It is therefore an object of the present invention to provide an improved method of producing capacitors.

It is another object of the present invention to provide an improved capacitor formed in accordance with the aforementioned process.

It is a further object of the present invention to provide a method of capacitor production wherein a liquid monomer is polymerized by irradiation in situ to form a solid dielectric.

It is yet another object of the present invention to provide a method of capacitor construction wherein a capacitor is fabricated containing solid and liquid dielectric with the latter being a liquid, paste or wax monomer and subjecting the assemblage to controlled ionizing irradiation to polymerize the monomer forming a solid dielectric therefrom.

It is a still further object of the present invention to provide an improved capacitor having as a solid dielectric enveloping the electrodes thereof a polyethylene or polystyrene formed by controlled irradiation of paste, liquid or wax monomers in situ with the capacitor structure.

Various other possible objects and advantages of the invention will become apparent to those skilled in the art from the following description of the invention wherein said invention is referenced to particular preferred embodiments thereof which are not to be taken as limiting; the true scope of the invention being set out in the appended claims.

There are included as a part of the specification drawings illustrative of the invention and briefly described as follows:

Figure 1 is a diagrammatic representation of successive steps of the invention.

Figure 2 is a schematic illustration of the irradiation of the capacitor during the process of production thereof.

Figure 3 is a perspective view of a capacitor in accordance with the invention with portions broken away as indicated to show interior structure.

Considering first the method of the invention in some detail and referring first to Figure 1 of the drawings the first step A thereof includes the alignment within a container 11 of two or more metal electrodes 12 as by means of a solid dielectric 13. This provision of a solid dielectric 13 accomplishes the result of properly spacing the electrodes 12 which may have a very limited thickness and to be in fact only thin sheets of metal having but limited structural rigidity, as noted in more detail hereinafter. No attempt is made herein to accurately reproduce actual capacitor structure, as is shown in Figure 3, but instead the various parts of Figure 1 are only representative of the steps of the invention. Following alignment of the electrodes 12 within the container 11 the container is filled with a suitable fluid impregnant 14 in the form of a liquid, paste or wax that is mobile during entry thereof into the container so that complete enveloping of the electrodes is effected. This impregnating dielectric 14 comprises a suitable monomer, as is discussed at some length hereinafter, which is susceptible to polymerization by irradiation. Subequent to the filling of the capacitor envelope 11 with the liquid dielectric 14 the assembly is uniformly irradiated with a controlled dosage of subatomic particles or rays 16. In this respect it has been found particularly advantageous to employ electron beams for relatively thin structures and X-rays where greater penetration is required by the bulk of the capacitor.

With the irradiating beam 16 directed upon the capacitor from a single direction, as is most conveniently accomplished, the capacitor is preferably rotated to subject all portions thereof to an equal and even dosage. This irradiation of the liquid dielectric 14 with a beam 16 as set out above causes a growth of molecular linkage whereby the dielectric solidifies to produce within the container 11 a solid dielectric 14 entirely enveloping the electrodes 12 whereby the resultant advantages of solid and liquid dielectrics are obtained without many of the disadvantages of either.

As regards the dielectrics employed in the capacitor, two of the most desirable are polyethylene and polystyrene and either of these may be used as the solid dielectric 13. As to the impregnant or liquid dielectric 14 there is employed a fluid monomer which polymerizes with irradiation. Examples of suitable materials in this respect are liquid styrene and certain low molecular weight waxes which are by-products in the manufacture of solid polyethylene from ethylene gas. Certain properties of interest are as follows:

|  | Polyethylene | Polystyrene |
| --- | --- | --- |
| Dielectric Strength | 460 | 500-700 |
| Dielectric Constant | 2.3 | 2.5 |
| Resistivity | $10^{13}$ | $10^{18}$ |
| Dissipation Factor | 0.005 | 0.0001-0.0004 |

A wide variety of monomers are suitable for use in the present invention, however, those above noted are particularly advantageous as can be seen from the above table. Certain of the waxes above mentioned may be solid at room temperature but melt at slightly elevated temperatures whereby they will readily flow into the capacitor envelope and thus heating of the dielectric forms a part of the method in the particular circumstance wherein such dielectrics are employed.

Not only are the electrical properties of the dielectric of importance but also mechanical and chemical properties need be considered. Particular advantage obtains from the present invention in this respect for radiation produced polymers have particularly desirable characteristics as compared to those produced by more conventional means. Not only does the radiation increase the molecular weight to form a solid but it cross-links the polymer chains whereby the resultant material has improved high temperature properties. Radiation produced polymers are not entirely thermoplastic but have no apparent melting temperature, with the material retaining form stability and strength at temperatures far above the normal melting temperatures of ordinary polystyrene and polyethylene. Rather large amounts of radiation makes polyethylene amorphous, glass-like and hard, which is desirable in certain applications.

Although two specific materials are set out hereinbefore as suitable dielectrics no limitation is intended thereby and strictly as examples the following materials may be employed in this respect: polyester casting resins, "Terylene," nylon and unvulcanized rubber. Care must also be taken in avoiding certain polymers such as cellulose or polymethyl methacrylate which degrade upon being irradiated instead of exhibiting the desired cross-linkage.

Considering now the step of irradiating the filled capacitor structure as set forth in the third step of the method outlined above and referring to Figure 2 of the drawings, the capacitor 17 is removably mounted upon a turntable 18 adapted to be rotated at a constant speed as by a motor 19 disposed beneath same. A suitable beam generator or particle accelerator 21 is disposed adjacent the capacitor directing ionizing radiation thereon, as illustrated. Various X-ray machines are suitable to produce an X-ray beam that may be employed in this respect or an electron accelerator for example may be employed. Such an accelerator may have the following characteristics:

| | |
| --- | --- |
| Electron beam energy | volts 6,000,000 |
| Beam power | kilowatts 4 |
| Beam current (average) | milliamperes 0.7 |
| Beam current (peak) | amperes 0.2 |
| Pulse length | microseconds 10 |
| Pulse repetition rate | per second 360 |

This represents a travelling wave linear accelerator and it is to be noted that a high voltage machine is not required. It has been found that in general a radiation dosage of two to fifty million rep units is sufficient for polymerizing the liquid dielectric or impregnant. As hereinbefore noted, this irradiation of the capacitor including the impregnant 14 polymerizes the latter to form a solid dielectric of improved properties. The capacitor 17 may be placed in an evacuated enclosure 22 during the irradiation if it is desired to limit surface oxidation.

Although a wide variety of capacitor structures are possible with the present invention one particular structure shown in Figure 3, to which reference is hereby made, includes a cylindrical envelope or container 31 within which is disposed a capacitance unit formed of a pair of sheet electrodes 32 and 33 fabricated of metal foil or the like separated from each other by dielectric ribbon 34. This assembly is then appropriately rolled to form a cylindrical unit. The container 31 is supplied with sufficient impregnant or liquid dielectric 14 to fill the container after insertion of the capacitance unit, with care being taken to remove any air bubbles from the container. Suitable capacitor terminals are then formed and a cover placed on the container within which is disposed the capacitance unit. The capacitor is then in condition for polymerizing irradiation as hereinbefore described to complete the capacitor, with suitable venting for discharge of gases emitted in the process.

Moreover it is found advantageous to fill the container with the liquid or fluid impregnant in vacuuo in order to eliminate the last trace of air bubble formation. Also, it will be readily apparent to those skilled in the art that the present invention comprehends the use of gaseous monomeric fluid impregnants in appropriate manner and when desired as well as monomers in liquid form. Furthermore, the term "monomer" and its cognates as used herein is not intended to be restricted to pure chemical monomeric substances per se, but to include closely related materials of relatively low molecular weights as distinguished from higher molecular weight polymers.

While the salient features of this invention have been described in detail with respect to certain embodiments thereof, it will of course be apparent that certain modifications may be made within the spirit and scope of this invention, and it is not desired therefore to limit the invention to the exact details shown except insofar as they may be defined in the following claims.

What is claimed is:

1. The method of electrical capacitor production comprising the steps of spacing a pair of electrodes in a container, filling said container in enveloping relation to said electrodes with a fluid dielectric that is polymerizable with penetrating ionizing radiation, and irradiating said container and enclosed fluid dielectric with penetrating ionizing radiation in an amount sufficient to solidify said dielectric.

2. A method of producing electrical capacitors comprising the steps of spacing a plurality of electrodes in a container, encompassing said electrodes with a liquid dielectric within said container, said dielectric having the property of polymerizing upon irradiation, directing a beam of ionizing radiation upon said container, rotating said container to insure uniform irradiation of all contents thereof, and continuing said irradiation for a time sufficient to solidify said dielectric in situ.

3. A method of producing an electrical capacitor comprising the steps of spacing apart a plurality of sheet electrodes with solid sheet dielectric within a container, filling said container with a liquid dielectric sufficient at least to envelope said electrodes, said dielectric being chosen from a group of organic monomers which polymerize upon irradiation, rotating said container, and directing a beam of penetrating ionizing radiation upon said rotating cylinder at substantially right angles to the axis of rotation thereof for a time sufficient to solidify said liquid dielectric.

4. A method of producing electrical capacitors comprising the steps of interleaving a plurality of thin sheets of solid dielectric material and electrically conducting material in alternate relationship, disposing said interleaved sheets in an enveloping container, filling said container with a monomer which polymerizes upon irradiation, and irradiating said container and contents with ionizing radiation having an energy sufficient to penetrate same and for a time sufficient to polymerize said liquid dielectric to a solid.

5. A method of producing electrical capacitors as claimed in claim 4 further characterized by said ionizing radiation comprising an electron beam containing electrons having an energy of at least two million electron volts.

6. A method of producing electrical capacitors as claimed in claim 4 further characterized by said irradiation continuing until said liquid dielectric receives a radiation dosage of from two to fifty million rep units for complete polymerization.

7. The method of fabricating electrical capacitors which comprises the steps of separating two sheet electrodes with a sheet dielectric member, rolling the electrodes and contained dielectric member so as to maintain electrode separation, inserting the rolled electrodes in a container, filling said container with a thermoplastic monomer in a fluid form, and irradiating the container and contents with pentrating ionizing radiation for a time sufficient to polymerize said monomer whereby same assumes a solid state.

References Cited in the file of this patent

UNITED STATES PATENTS

| 1,818,073 | Long | Aug. 11, 1931 |
| 2,266,809 | Ruben | Dec. 23, 1941 |
| 2,476,455 | Roush | July 19, 1949 |
| 2,684,317 | Burnham | July 20, 1954 |

FOREIGN PATENTS

| 563,500 | Great Britain | Aug. 17, 1944 |

OTHER REFERENCES

Charlesby: "How Radiation Affects Long-Chain Polymers," from Nucleonics, pages 18–25, June 1954.

"Irradiated Polyethylene," Modern Plastics, volume 31 No. 8, April 1954, pages 100, 101 and 219.